United States Patent
Delezoide et al.

(10) Patent No.: US 11,502,747 B2
(45) Date of Patent: Nov. 15, 2022

(54) PERFORMANCE MONITOR FOR AN OPTICAL COMMUNICATION SYSTEM

(71) Applicant: Nokia Solutions and Networks Oy, Espoo (FI)

(72) Inventors: Camille Delezoide, Gambais (FR); Petros Ramantanis, Antony (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/488,689

(22) Filed: Sep. 29, 2021

(65) Prior Publication Data

US 2022/0116110 A1 Apr. 14, 2022

(30) Foreign Application Priority Data

Oct. 8, 2020 (EP) .................................... 20315431

(51) Int. Cl.
| | |
|---|---|
| *H04B 10/077* | (2013.01) |
| *H04B 17/336* | (2015.01) |
| *H04B 10/079* | (2013.01) |
| *H04B 10/50* | (2013.01) |
| *H04B 10/60* | (2013.01) |
| H04B 10/40 | (2013.01) |

(52) U.S. Cl.
CPC ..... *H04B 10/0775* (2013.01); *H04B 10/0773* (2013.01); *H04B 10/07953* (2013.01); *H04B 17/336* (2015.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 7,266,310 B1 | 9/2007 | Savory et al. |
| 7,636,525 B1 | 12/2009 | Bontu et al. |

(Continued)

OTHER PUBLICATIONS

Extended European Search Report for corresponding European application No. 20315431.5; dated Apr. 6, 2021 (7 pages).

(Continued)

*Primary Examiner* — Darren E Wolf
(74) *Attorney, Agent, or Firm* — Mendelsohn Dunleavy, P.C.; Steve Mendelsohn; Yuri Gruzdkov

(57) ABSTRACT

A performance monitor configured to unify at least two different signal-quality estimates into a single performance metric such that a systematic error associated with the performance metric can be approximately constant or smaller than a specified fixed limit over a significantly wider range of data-link conditions than that of a conventional performance metric of similar utility. In an example embodiment, the performance metric can be based on a weighted sum of two different SNR estimates, obtained from an error count of the receiver's FEC decoder and from a constellation scatter plot generated using the receiver's symbol decoder, respectively. Different weights for the weighted sum may be selected for different data-link conditions, e.g., using SNR thresholding, analytical formulas, or pre-computed look-up tables. The performance metric may be supplied to a control entity and considered thereby as a factor in a possible decision to trigger protective switching and/or a transponder-mode change.

15 Claims, 6 Drawing Sheets

(56) References Cited

U.S. PATENT DOCUMENTS

| | | | |
|---|---|---|---|
| 7,747,177 B2 | 6/2010 | Chen et al. | |
| 8,073,345 B2 | 12/2011 | Chen et al. | |
| 8,260,154 B2 | 9/2012 | Chang et al. | |
| 9,020,364 B2 | 4/2015 | Xie et al. | |
| 9,112,614 B2 | 8/2015 | Randel et al. | |
| 9,762,379 B2 | 9/2017 | Kaneda | |
| 2011/0122787 A1* | 5/2011 | Wang | H04L 1/20 370/252 |
| 2012/0069854 A1* | 3/2012 | Suzuki | H04J 14/06 370/465 |
| 2012/0213532 A1* | 8/2012 | Hironishi | H04B 10/6161 398/208 |
| 2014/0086594 A1 | 3/2014 | Xie et al. | |
| 2015/0372764 A1 | 12/2015 | Kaneda | |
| 2016/0065315 A1 | 3/2016 | Koike-Akino et al. | |
| 2016/0323900 A1* | 11/2016 | De Domenico | H04W 24/02 |
| 2017/0285207 A1* | 10/2017 | Shao | H02J 50/60 |
| 2017/0351241 A1* | 12/2017 | Bowers | G06N 5/022 |
| 2020/0177307 A1 | 6/2020 | Pan | |

OTHER PUBLICATIONS

Bononi, Alberto, et al. "A Fresh Look at Multicanonical Monte Carlo from a Telecom Perspective." GLOBECOM, IEEE Global Telecommunications Conference Honolulu, HI, USA (2009): 1-8.

Delezoide, Camille, et al. "Leveraging Field Data for the Joint Optimization of Capacity and Availability in Low-Margin Optical Networks." Journal of Lightwave Technology 38.24 (2020): 6709-6718.

Proakis, John, "Digital Communications." 4th edition, McGraw-Hill (2000): 1-933.

Ramantanis, Petros, et al. "Revisiting the calculation of performance margins in monitoring-enabled optical networks." Journal of Optical Communications and Networking 11.10 (2019): C67-C75.

Wikipedia contributors. "Unbiased estimation of standard deviation." Wikipedia, The Free Encyclopedia. <URL: https://en.wikipedia.org/w/index.php?title=Unbiased_estimation_of_standard_deviation&oldid=955306695> (May 7, 2020): 8 pages.

\* cited by examiner

200

400

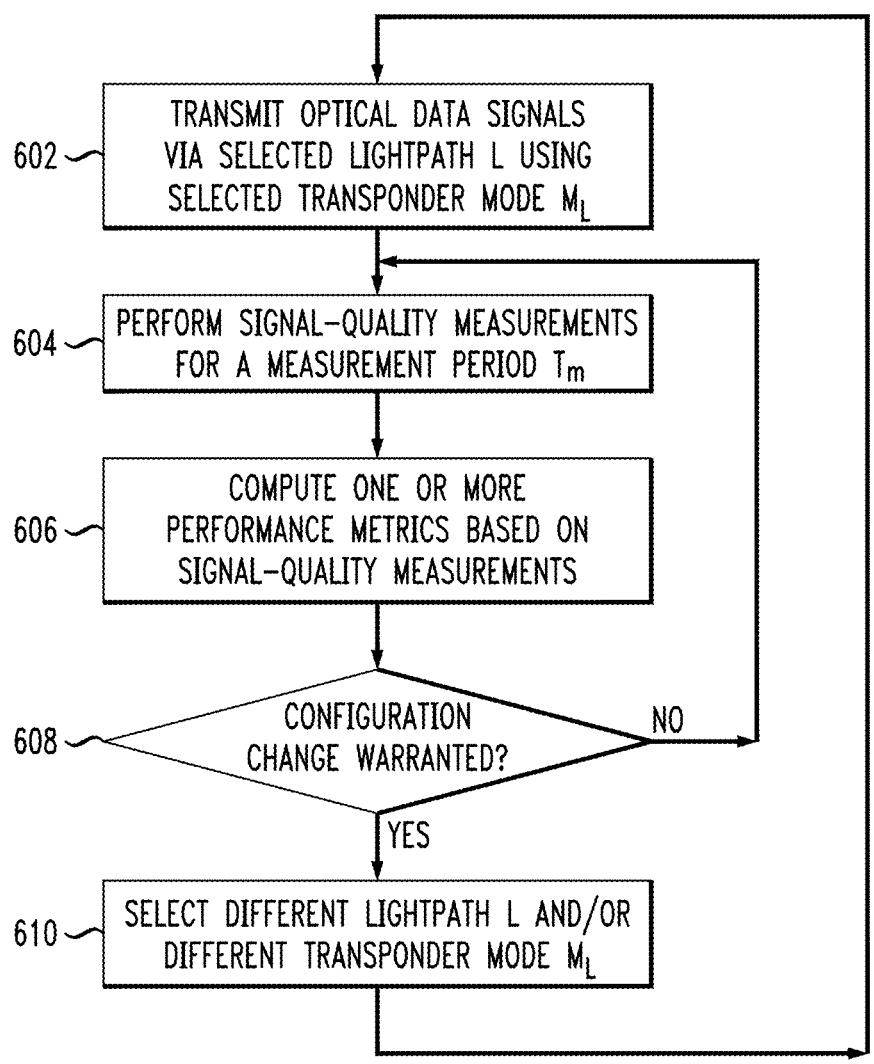

PERFORMANCE MONITOR FOR AN OPTICAL COMMUNICATION SYSTEM

BACKGROUND

Field

Various example embodiments relate to optical communication equipment and, more specifically but not exclusively, to monitoring and control equipment for optical communication systems.

Description of the Related Art

This section introduces aspects that may help facilitate a better understanding of the disclosure. Accordingly, the statements of this section are to be read in this light and are not to be understood as admissions about what is in the prior art or what is not in the prior art.

Communication network operators are facing a fast growth in the bandwidth demand, in part due to the development and deployment of cloud-based services. As a result, there is a need to optimize the capacity and performance of existing fiber-optic cable plants to enable the corresponding networks to efficiently handle the increasing volumes of data. Due to this need, one of the requirements to telecom equipment manufacturers is to provide the network operator(s) with a supervisory system that can be used to monitor the status of various network elements, e.g., to guarantee fault detection, prediction, and diagnostics, improved maintainability, good performance characteristics, and/or any other pertinent benchmarks.

SUMMARY OF SOME SPECIFIC EMBODIMENTS

Disclosed herein are various embodiments of a performance monitor configured to unify at least two different signal-quality estimates into a single performance metric, e.g., such that a systematic error associated with the performance metric can be approximately constant or, at least, smaller than a specified fixed limit over a significantly wider range of data-link conditions than that of a conventional performance metric of similar utility. In an example embodiment, the performance metric can be based on a weighted sum of two different signal-to-noise ratio (SNR) estimates, obtained from an error count of the receiver's forward-error-correction (FEC) decoder and from the digital-sample scatter detected using the receiver's symbol decoder, respectively. Different weights for the weighted sum may be selected for different data-link conditions, e.g., using SNR thresholding, analytical or empirical models, and/or pre-computed look-up tables. The performance metric computed in this manner may be supplied to a control entity and considered thereby as a factor in a possible decision to trigger protective switching and/or a transponder-mode change.

According to an example embodiment, provided is an apparatus, comprising: an optical data receiver including one or more light detectors connected to convert modulated light into digital samples and further including a symbol decoder and an FEC decoder connected to process the digital samples to recover a data stream encoded in the modulated light; and a performance monitor to evaluate a performance metric in response to an error count from the FEC decoder and in response to a stream of measured constellation symbols from the symbol decoder, the performance metric being based on a weighted sum of a first signal-quality estimate determined based on the error count and a second signal-quality estimate determined based on deviations of the digital samples from constellation symbols.

According to another example embodiment, provided is a control method, comprising the steps of: (A) generating a first signal-quality estimate based on an error count at an FEC decoder of an optical data receiver; (B) generating a second signal-quality estimate based on deviations of digital samples from constellation symbols, the digital samples being generated by the optical data receiver in response to modulated light, the constellation symbols being determined by a symbol decoder of the optical data receiver by constellation-mapping the digital samples; and (C) computing a weighted sum of the first and second signal-quality estimates to generate a performance metric for a data link, the modulated light being used in the data link to transmit a data stream to the optical data receiver.

BRIEF DESCRIPTION OF THE DRAWINGS

Other aspects, features, and benefits of various disclosed embodiments will become more fully apparent, by way of example, from the following detailed description and the accompanying drawings, in which:

FIG. 6 shows a flowchart of a control method that can be used, e.g., in the optical communication system of FIGS. 1-3 according to an embodiment.

DETAILED DESCRIPTION

Different performance metrics can be used to quantify the transmission quality in optical communication systems. Some of such performance metrics may be based on measurements of one or more selected signal characteristics at the corresponding optical data receiver(s). For example, the optical signal-to-noise ratio (OSNR) can be measured at the receiver's optical input port using an optical spectrum analyzer. This technique may be available in some optical communication systems, e.g., as a feature inherited from the 10G era. However, this particular technique may not be well suited for coherent Dense Wavelength Division Multiplexing (DWDM) channels often employed in modern optical communication systems. The bit-error rate (BER) of a DWDM channel can be estimated, e.g., by counting the number of errors detected and/or corrected by the receiver's forward-error-correction (FEC) decoder. For example, in some implementations, the BER can be captured by inverting the bit-parity-violation rate at the FEC decoder. However, this particular technique may only be useful under poor channel conditions, i.e., when the OSNR is relatively low and the error rate is correspondingly high, and may not be sensitive enough and/or accurate enough in some situations, e.g., when the OSNR is relatively high. The signal-to-noise ratio (SNR) in the electrical domain of the optical receiver (i.e., the electrical SNR, ESNR) can be estimated, e.g., by analyzing or measuring the scatter of signal samples around the corresponding constellation points (see, e.g., FIG. 4). However, this particular technique may be able to provide accurate results, e.g., only when the ESNR is relatively high, and may not be accurate enough when the signal quality is relatively poor. Thus, there is a need for a more-generally applicable performance metric, e.g., appropriate for a relatively wide range of channel conditions and/or suitable for capacity optimization under variable channel conditions.

These and possibly some other related problems in the state of the art can beneficially be addressed using at least some embodiments of a closed-loop capacity-optimization scheme disclosed herein. In an example embodiment, a network control entity can be configured to cause configuration changes in response to a performance metric generated by the corresponding performance monitor such that an intrinsic (e.g., systematic) error associated with the performance metric may be approximately constant or, at least, smaller than a specified fixed limit over a significantly wider range of data-link conditions than that of a conventional performance metric of similar utility. Example configuration changes may include but are not limited to protective lightpath switching and changes of the transponder mode. An additional feature of some embodiments may be the ability to generate alarms to alert the control entity to malfunctions requiring fairly expeditious remedial actions.

Figure 1:
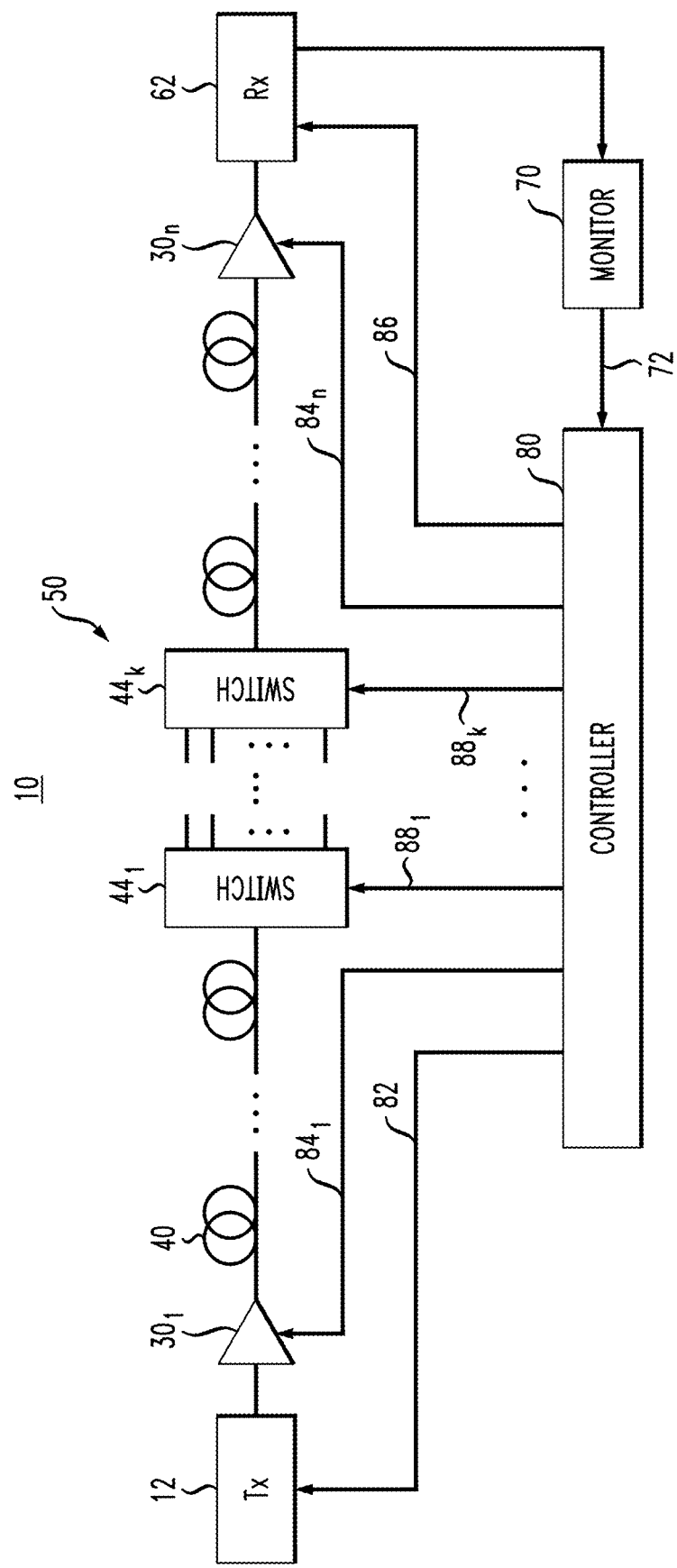
FIG. 1 shows a block diagram of an optical communication system according to an embodiment.

FIG. 1 shows a block diagram of an optical communication system 10 according to an embodiment. System 10 comprises an optical data transmitter 12 and an optical data receiver 62 connected using a fiber-optic link 50. In some embodiments, optical data transmitter 12 and optical data receiver 62 may have wavelength-division-multiplexing (WDM) capabilities.

In an example embodiment, link 50 can be implemented using one or more spans of optical fiber 40. In addition, link 50 may have: (i) one or more optical amplifiers 30, each connected between two respective spans of fiber 40; and one or more optical switches 44, each connected between respective pluralities of spans of fiber 40. In some embodiments, link 50 may also include additional optical elements (not explicitly shown in FIG. 1), such as optical splitters, combiners, couplers, add-drop multiplexers, etc., as known in the pertinent art.

In an example embodiment, an optical amplifier 30 can be implemented as known in the pertinent art, e.g., using an erbium-doped fiber, a gain-flattening filter, and one or more laser-diode pumps. The number n of optical amplifiers 30 used in optical link 50 depends on the particular embodiment and may be in the range, e.g., from 1 to ~200. A typical length of the fiber span between two adjacent optical amplifiers 30 may range from ~50 km to ~150 km.

In some embodiments, link 50 may not have any optical amplifiers 30 therein.

In an example embodiment, an optical switch $40_i$ (where i=1, . . . , k) is an $N_i \times M_i$ optical switch, where $N_i$ and $M_i$ are positive integers. In the shown example, optical switch $40_1$ is a $1 \times M_1$ switch, and optical switch $40_k$ is an $N_k \times 1$ switch. A person of ordinary skill in the art will understand that other switch parameters and/or other switch-connection topologies are also possible in various alternative embodiments. In some embodiments, some or all of optical switches 40 may comprise wavelength-selective switches.

In some embodiments, system 10 may be configured to transport, e.g., optical polarization-division-multiplexed (PDM) signals, wherein each of two orthogonal polarizations of each optical WDM channel can be used to carry a different respective data stream.

An example embodiment of optical data receiver 62 is described in more detail below in reference to FIG. 2. In some embodiments, optical data receiver 62 may comprise a direct-detection optical receiver. A direct-detection optical receiver typically employs a light detector configured to measure only light intensities, e.g., the light detector may be a single photodiode as opposed to a pair of photodiodes configured for differential detection. Such a direct-detection optical receiver does not typically employ an optical hybrid. In some embodiments, a direct-detection optical receiver can be implemented by appropriately modifying or reconfiguring the coherent optical receiver of FIG. 2. A person of ordinary skill in the art will understand that signal processing in a direct-detection optical receiver 62 and in a corresponding performance monitor 70 may be different from that corresponding to a coherent optical receiver.

System 10 further comprises a performance monitor 70 and an electronic controller 80. Performance monitor 70 is connected to optical data receiver 62 to receive therefrom measurements 64 of one or more selected signal characteristics, e.g., as described below in reference to FIGS. 2-6. In operation, performance monitor 70 processes the received measurements 64 and, based on the processing results, generates a feedback signal 72 for controller 80. In response to the feedback signal 72, controller 80 may generate control signals 82, $84_1$-$84_n$, 86, and $88_1$-$88_k$. In some embodiments, some or all of control signals $84_1$-$84_n$ may be optional and, as such, may not be present. In some embodiments, some or all of control signals $88_1$-$88_k$ may be optional and, as such, may not be present.

Control signal 82 is applied to optical data transmitter 12 and is used thereat to set and/or change one or more configuration parameters, such as the output optical power, modulation format, baud rate, etc. Each of control signals $84_1$-$84_n$ can be applied to a respective one of optical amplifiers $30_1$-$30_n$ to set and/or change the optical gain, current, and/or output optical power thereof. Control signal 86 is applied to optical data receiver 62 and is typically used to inform the optical data receiver about any pertinent configuration changes effected by control signal 82 at optical data transmitter 12 to enable the optical data receiver to adjust its configuration parameters accordingly. For example, if control signal 82 causes optical data transmitter 12 to change the operative constellation, then control signal 86 causes optical data receiver 62 to similarly change the constellation used in the symbol decoder thereof such that there is no disruption in the data recovery thereat. Each of control signals $88_1$-$88_k$ can be applied to a respective one of optical switches $44_1$-$44_k$ to set and/or change the routing configuration thereof. For example, controller 80 may be configured to change the configuration of some of the switches 44 to reroute the optical signal transmitted between optical data transmitter 12 and optical data receiver 62 via a different fiber path. In general, controller 80 may be programmed to generate control signals 82, $84_1$-$84_n$, 86, and $88_1$-$88_k$ in a mutually dependent manner, e.g., as a self-consistent set of control signals, to ensure proper operation of system 10.

In different embodiments, various components of performance monitor 70 and electronic controller 80 may be differently distributed within system 10. For example, some components of performance monitor 70 may be co-located with optical data receiver 62. Some components of performance monitor 70 may be co-located with controller 80.

Some components of controller 80 may be co-located with optical data receiver 62. Some or all components of controller 80 may be implemented using a network controller of system 10 (not explicitly shown in FIG. 1). In some embodiments, performance monitor 70 and controller 80 may be implemented using a software package running on one or more processors of system 10. Depending on the specific embodiment, some of such processors may be co-located or distributed over several relatively remote locations.

Figure 2:
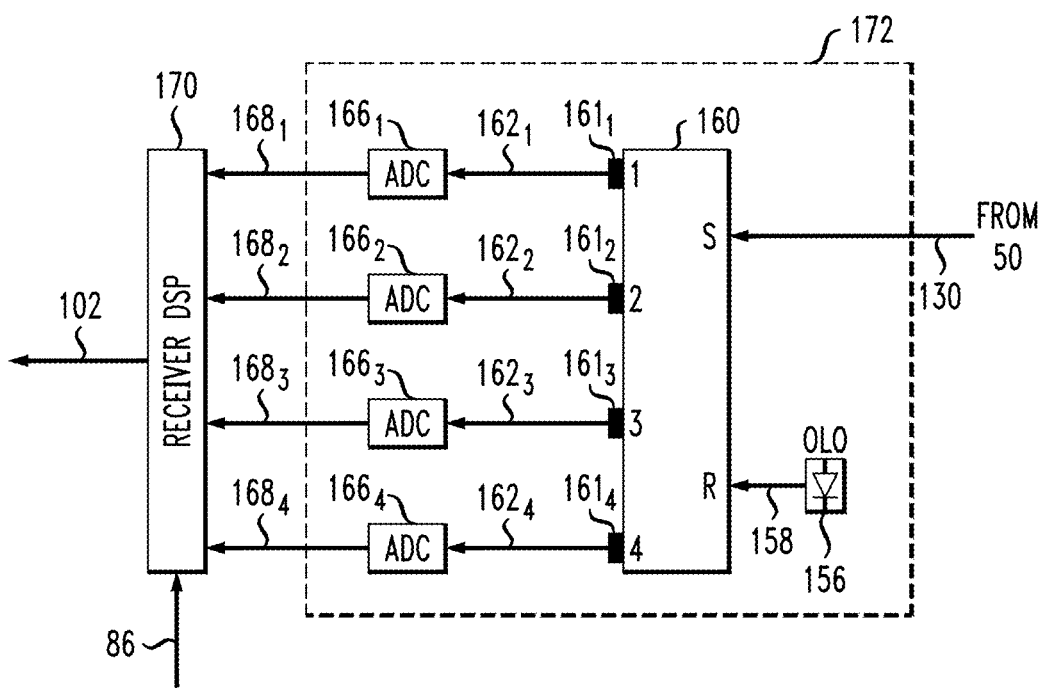
FIG. 2 shows a block diagram of an optical data receiver that can be used in the optical communication system of FIG. 1 according to an embodiment.

FIG. 2 shows a block diagram of one example of an individual-channel optical data receiver 200 that can be used in optical data receiver 62 (FIG. 1) according to an embodiment. For example, in a WDM-compatible embodiment, optical data receiver 62 may include two or more instances of receiver 200, each configured to operate using a different respective carrier wavelength as known in the pertinent art. As shown in FIG. 2, optical receiver 200 comprises a front-end circuit 172 and a digital signal processor (DSP) 170.

Front-end circuit 172 comprises an optical hybrid 160, light detectors (e.g., sets of photodiodes) $161_1$-$161_4$, analog-to-digital converters (ADCs) $166_1$-$166_4$, and an optical local-oscillator (OLO) source 156. Optical hybrid 160 has (i) two input ports labeled S and R and (ii) four output ports labeled 1 through 4. Input port S is connected to receive an optical input signal 130 from optical link 50 (also see FIG. 1). Input port R is connected to receive an OLO signal 158 generated by an OLO source (e.g., a laser) 156. OLO signal 158 has an optical-carrier wavelength (frequency) that is sufficiently close to that of optical input signal 130 to enable coherent (e.g., intradyne) detection of the latter signal. In some embodiments, OLO source 156 can be implemented using a relatively stable tunable laser.

Optical hybrid 160 operates to mix optical input signal 130 and OLO signal 158 to generate different relative phase combinations thereof (not explicitly shown in FIG. 2). Light detectors $161_1$-$161_4$, e.g., balanced pairs of photodiodes connected for differential detection from corresponding optical outputs, may then convert the corresponding mixed optical signals into electrical signals $162_1$-$162_4$ that are indicative of complex values corresponding to two orthogonal-polarization components of signal 130. For example, electrical signals $162_1$ and $162_2$ may be an analog in-phase (I) signal and an analog quadrature-phase (Q) signal, respectively, corresponding to a first (e.g., horizontal, h) polarization component of signal 130. Electrical signals $162_3$ and $162_4$ may similarly be an analog I signal and an analog Q signal, respectively, corresponding to a second (e.g., vertical, v) polarization component of signal 130.

In some embodiments, to enable separate detection of orthogonal polarization components, the optical hybrid 160 may include two separate about 90-degree optical hybrids and a polarization splitter connecting one of the optical inputs 130 or 158 to the optical hybrids. Then, the other of the optical inputs 130 or 158 is connected to the two separate about 90-degree optical hybrids by a power splitter or another polarization splitter.

Each of electrical signals $162_1$-$162_4$ is converted into digital form in a corresponding one of ADCs $166_1$-$166_4$. Optionally, each of electrical signals $162_1$-$162_4$ may be amplified in a corresponding electrical amplifier (not explicitly shown in FIG. 2) prior to the resulting signal being converted into digital form. Digital signals $168_1$-$168_4$ produced by ADCs $166_1$-$166_4$ are then processed by DSP 170 to recover one or more original data streams 102 encoded in the optical input signal 130 by optical data transmitter 12 (also see FIG. 1).

In an example embodiment, DSP 170 may perform, inter alia, one or more of the following: (i) signal processing directed at dispersion compensation; (ii) signal processing directed at reducing nonlinear distortions; (iii) electronic polarization de-multiplexing and/or signal processing to correct effects of polarization rotation; (iv) signal processing to correct relative phase misalignment of the OLO 156; (v) signal processing to correct mixing phase misalignment to measure the I and Q signals; and (vi) FEC-based error correction. The processing applied by DSP 170 to digital signals $168_1$-$168_4$ may be (re)configured based on control signal 86, e.g., as mentioned above in reference to FIG. 1. Example embodiments of DSP 170 are described in more detail below in reference to FIG. 3.

Figure 3:
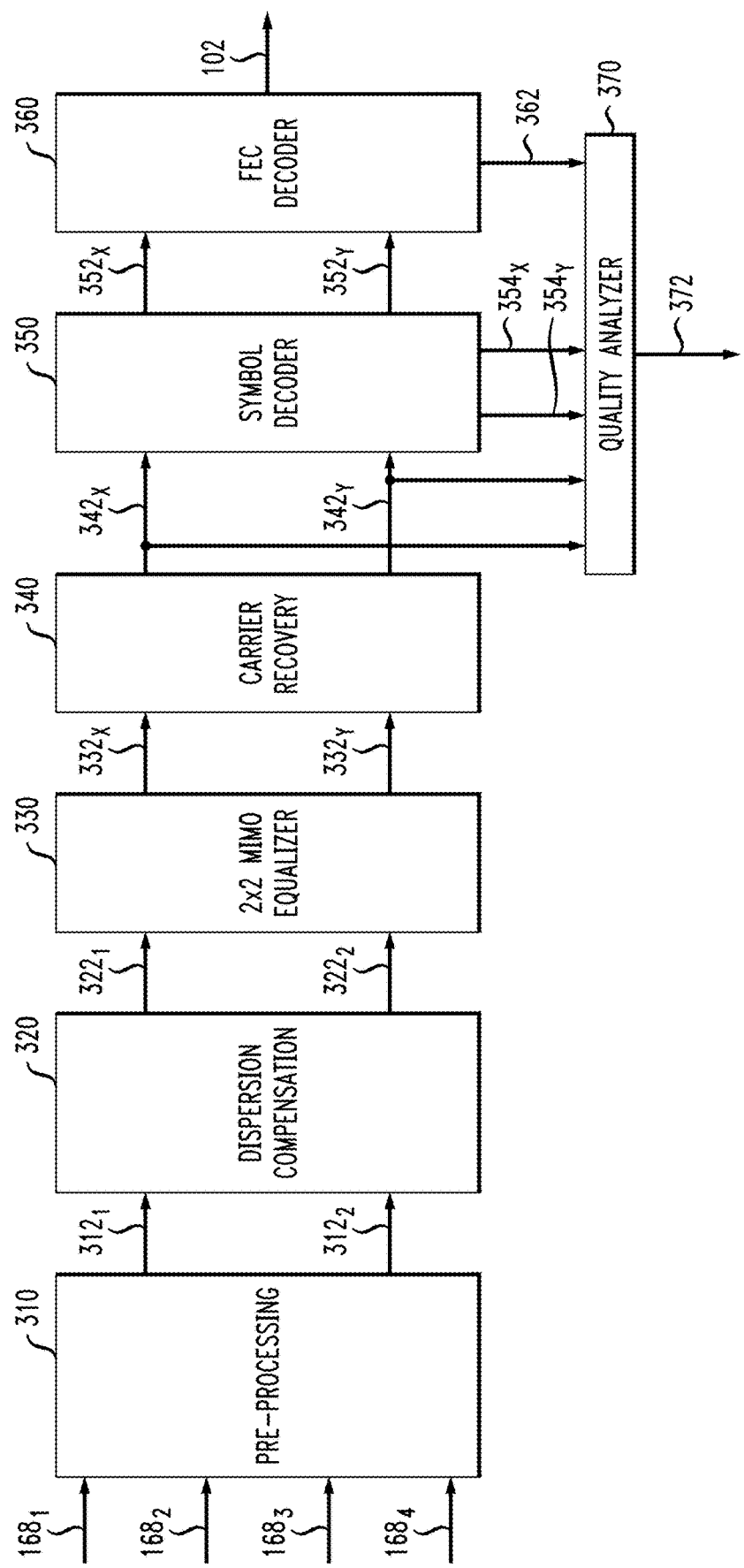
FIG. 3 shows a block diagram of a digital signal processor that can be used in the optical data receiver of FIG. 2 according to an embodiment.

FIG. 3 shows a block diagram of DSP 170 (FIG. 2) according to an embodiment. Digital signals $168_1$-$168_4$ and data stream 102 are also shown in FIG. 3 to better illustrate the relationship between the circuits shown in FIGS. 2 and 3.

Ideally, digital signals $168_1$ and $168_2$ represent the I and Q components, respectively, of the horizontal polarization component of optical signal 130, and digital signals $168_3$ and $168_4$ represent the I and Q components, respectively, of the vertical polarization component of that optical signal. However, various transmission, measurement, and/or fabrication impairments, signal distortions in front-end circuit 172, and/or configuration inaccuracies and errors generally cause each of digital signals $168_1$-$168_4$ to have various linear and nonlinear distortions and/or mixing of both of the original PDM and/or the original I and Q components generated by optical data transmitter 12 (FIG. 1). The signal-processing chain of DSP 170 is generally directed at reducing the adverse effects of such signal distortions and mixing in the digital signals $168_1$-$168_4$ so that the transmitted data can be properly recovered to generate the output data stream 102.

In an example embodiment shown in FIG. 3, DSP 170 comprises a signal pre-processing module 310 configured to receive digital signals $168_1$-$168_4$. One of the functions of module 310 may be to adapt the signal samples received via digital signals $168_1$-$168_4$ to a form that is more suitable for the signal-processing algorithms implemented in the downstream circuits of DSP 170. For example, module 310 may be configured to (i) resample digital signals $168_1$-$168_4$ and/or (ii) convert real-valued signal samples into the corresponding complex-valued signal samples. The resulting complex-valued digital signals generated by signal-pre-processing module 310 are labeled $312_1$-$312_2$.

Complex-valued digital signals $312_1$ and $312_2$ are applied to a dispersion-compensation module 320 for dispersion-compensation processing therein, and the resulting dispersion-compensated signals are complex-valued digital signals $322_1$-$322_2$. Example circuits that can be used to implement dispersion-compensation module 320 are disclosed, e.g., in U.S. Pat. Nos. 8,260,154, 7,636,525, 7,266,310, all of which are incorporated herein by reference in their entirety.

Digital signals $322_1$ and $322_2$ are applied to a 2×2 MIMO (multiple-input/multiple-output) equalizer 330 for MIMO-equalization processing therein, and the resulting equalized signals are complex-valued digital signals $332_X$ and $332_Y$. In an example embodiment, equalizer 330 can be a butterfly equalizer configured to perform electronic polarization rotation/demultiplexing. Example 2×2 MIMO equalizers that can be used to implement equalizer 330 are disclosed, e.g., in U.S. Pat. No. 9,020,364 and U.S. Patent Application Publication No. 2015/0372764, both of which are incorporated herein by reference in their entirety.

Digital signals $332_X$ and $332_Y$ generated by equalizer 330 are applied to a carrier-recovery module 340 that is configured to perform signal processing generally directed at (i) compensating the frequency and/or phase mismatch between the carrier frequencies of optical LO signal 158 and optical input signal 130 and/or (ii) reducing the effects of phase noise of optical source(s). Various signal-processing techniques that can be used to implement the frequency-mismatch-compensation processing in carrier-recovery module 340 are disclosed, e.g., in U.S. Pat. Nos. 7,747,177 and 8,073,345, both of which are incorporated herein by reference in their entirety. Example signal-processing techniques that can be used to implement phase-error-correction processing in carrier-recovery module 340 are disclosed, e.g., in U.S. Pat. No. 9,112,614, which is incorporated herein by reference in its entirety.

Typically, DSP 170 also includes a clock-recovery circuit (not explicitly shown in FIG. 3). In some embodiments, the clock-recovery circuit may be directly inserted into the data-recovery chain of DSP 170, e.g., between equalizer 330 and carrier-recovery module 340. In some other embodiments, the clock-recovery circuit may be connected in a feedback configuration outside the direct data-recovery chain of DSP 170, with the feedback being provided to signal pre-processing module 310, a signal interpolator (not explicitly shown in FIG. 3), or ADCs 166. Example clock-recovery circuits that can be used for this purpose are disclosed, e.g., in U.S. Pat. No. 9,762,379, which is incorporated herein by reference in its entirety.

Digital signals $342_X$ and $342_Y$ generated by carrier-recovery module 340 are applied to a symbol decoder 350 that converts these digital signals into data streams $352_X$ and $352_Y$, respectively. In an example embodiment, symbol decoder 350 is configured to use the complex values conveyed by digital signals $342_X$ and $342_Y$ to appropriately map each complex value onto the operative constellation to determine the corresponding constellation symbol and, based on said mapping, determine the corresponding bit-word encoded in the complex value. Symbol decoder 350 then appropriately multiplexes and concatenates the determined bit-words to generate data streams $352_X$ and $352_Y$.

Symbol decoder 350 is further configured to provide each of the determined constellation symbols to a signal-quality analyzer 370 by way of digital signals $354_X$ and $354_Y$. More specifically, digital signals $354_X$ and $354_Y$ are generated to carry the complex values of the constellation points onto which the complex values supplied by digital signals $342_X$ and $342_Y$, respectively, have been mapped by symbol decoder 350. Each of the constellation points is represented by a respective complex value corresponding to the location of the constellation point on the complex I-Q plane.

An FEC decoder 360 is configured to apply FEC processing to data streams $352_X$ and $352_Y$. In an example embodiment, such processing may include the steps of: (i) multiplexing data streams $352_X$ and $352_Y$; (ii) correcting errors (if any) in blocks of data provided by multiplexed data streams $352_X$ and $352_Y$ using data redundancies therein and using the applicable FEC code; (iii) discarding the parity bits; and (iv) outputting information bits via data stream 102. FEC decoder 360 is further configured to count the errors detected and/or corrected at step (ii) and then provide a resulting error count 362 to signal-quality analyzer 370.

In an example embodiment, signal-quality analyzer 370 can be a part of performance monitor 70 (FIG. 1). In operation, signal-quality analyzer 370 processes digital signals $342_X$, $342_Y$, $354_X$, $354_Y$, and 362 to generate a performance metric 372, e.g., as described in more detail below.

Performance monitor 70 and controller 80 may then use the performance metric 372 to generate control signals 82, $84_1$-$84_n$, 86, and $88_1$-$88_k$, e.g., as described in more detail below in reference to FIG. 6.

In an example embodiment, signal-quality analyzer 370 may be configured to use the error count 362 to compute the pre-FEC bit error probability (BEP). The BEP can then be used to compute a first SNR estimate ($SNR_1$). Eqs. (1)-(2) provide mathematical formulas that can be used to program signal-quality analyzer 370 for such computations in example embodiments corresponding to a Quadrature Phase Shift Keying (QPSK) constellation and a 16-ary Quadrature Amplitude Modulation (16-QAM) constellation, respectively:

$$SNR_1 = 2\left[\mathrm{erfc}^{-1}(2BEP)\right]^2 \qquad (1)$$

$$SNR_1 = 10\left[\mathrm{erfc}^{-1}\left(\frac{8}{3}BEP\right)\right]^2 \qquad (2)$$

A person of ordinary skill in the pertinent art will understand how to program signal-quality analyzer 370 for such computations in other embodiments, e.g., corresponding to other constellations.

Figure 4:
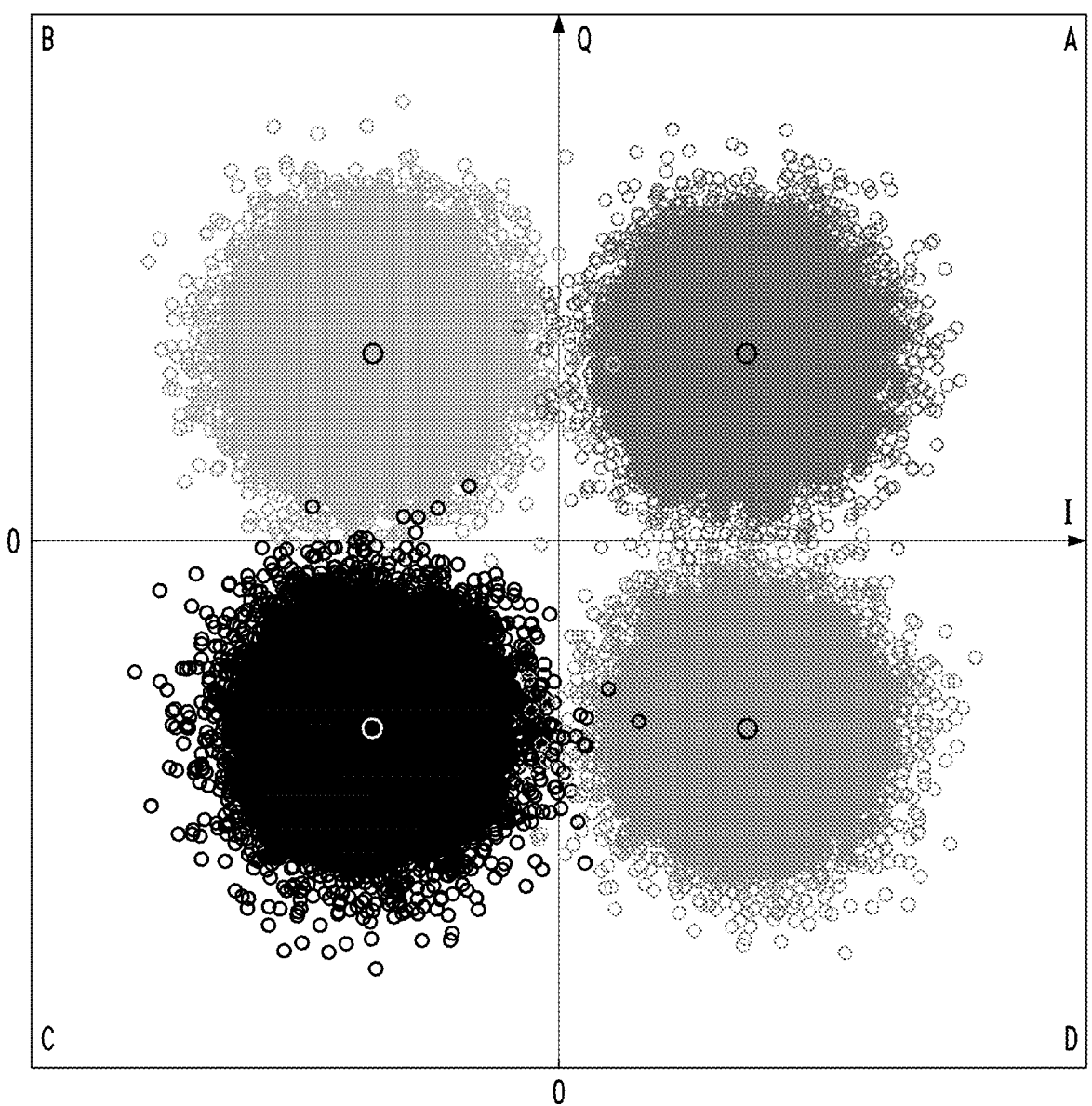
FIG. 4 graphically illustrates some of the signal processing that can be implemented using the digital signal processor of FIG. 3 according to an embodiment.

FIG. 4 graphically illustrates some of the signal processing that can be implemented in signal-quality analyzer 370 (FIG. 3) according to an embodiment. More specifically, FIG. 4 shows a constellation scatter plot 400 that graphically illustrates a second SNR estimate ($SNR_2$), which may be evaluated by signal-quality analyzer 370 based on digital signals $342_X$, $342_Y$, $354_X$, and $354_Y$. Scatter plot 400 corresponds to a QPSK constellation. In particular, the scatter of points about a value of a constellation symbol are indicative the noise. A person of ordinary skill in the pertinent art will understand that similar scatter plots can be generated for other constellations and how a DSP can use the measured scatter to determine the second SNR estimate.

The complex I-Q plane of scatter plot 400 has four quadrants, labeled A, B, C, and D, each hosting a corresponding one of the four constellation points of the QPSK constellation. Digital signals $342_X$ and $342_Y$ provide signal samples that are typically clustered around the constellation points. The lateral sizes (e.g., approximate diameters) of the clusters are related to the SNR, e.g., the larger the cluster diameter, the smaller the SNR. The probability distributions mathematically describing the clusters can thus be analyzed to determine the SNR. Qualitatively, the amplitude of the constellation point can represent the "signal" while Euclidean distances of the different signal samples from the corresponding constellation point on the I-Q plane can represent the "noise" in such an analysis.

In an example embodiment, signal-quality analyzer 370 can be configured to calculate $SNR_2$ from the noise variance, after normalizing the signal samples with respect to the average power. One should note however that an SNR estimate obtained in this manner might contain some intrinsic bias. For example, the SNR estimate computed in this manner can be relatively accurate when the signal quality (e.g., OSNR) is relatively high because most of the signal samples land in the same quadrant of the I-Q plane as the corresponding original constellation point. In contrast, when the signal quality is poor, the relatively high noise may cause a significant number of the signal samples to land in the quadrant(s) different from the quadrant of the corresponding original constellation point. When the probability-distribution analysis is performed on payload data (as opposed to training or pilot sequences), the receiver has no a priori knowledge of the transmitted data, which causes some of the signal samples to be attributed to incorrect sample clusters. As a result, the accuracy of noise-variance measurements may be detrimentally affected.

In some embodiments, e.g., for QPSK modulation where all constellation symbols have the same magnitude, a fourth power of the digital signal may be taken to eliminate the data dependence. The remaining scatter may be more-simply evaluated to determine noise values and a noise variance, e.g., to enable a determination of the $SNR_2$. In such embodiments, digital signals 354 may not be needed for or used by analyzer 370 to determine $SNR_2$.

For illustration purposes and without any implied limitations, some example embodiments are described herein below in reference to a performance metric 372 computed based on the above-mentioned SNR estimates $SNR_1$ and $SNR_2$ to generate a third SNR estimate ($SNR_3$) in accordance with Eq. (3):

$$SNR_3 = a \cdot SNR_1 + (1-a) \cdot SNR_2 \qquad (3)$$

where a is a suitably chosen real value from the interval (0,1). Alternative forms of performance metric 372 are also possible in different alternative embodiments. In general, the performance metric 372 may be based on any of: (i) the quality factor $Q^2$; (ii) the Q value expressed in decibel; (iii) BER; (iv) BEP; and (v) SNR. These quantities can be inter-converted, e.g., as known in the pertinent art. Furthermore, the term "performance metric" should be construed to cover any other value or quantity that can be unambiguously mapped onto $SNR_3$.

For example, for QPSK modulation, the BEP can be computed from the SNR as follows:

$$BEP = \frac{1}{2} \text{erfc}\left(\sqrt{\frac{SNR}{2}}\right) \qquad (4)$$

The quality factor $Q^2$ and BEP have a one-to-one correspondence that can be expressed, e.g., as follows:

$$BEP = \frac{1}{2} \text{erfc}\left(\frac{Q}{\sqrt{2}}\right) \approx \frac{1}{\sqrt{2\pi}Q} \exp\left(-\frac{Q^2}{2}\right) \qquad (5)$$

where $Q[dB]=10 \log_{10}(Q^2)$. Various combinations of the above-mentioned quantities may also be computed and interconverted accordingly.

Figure 5:
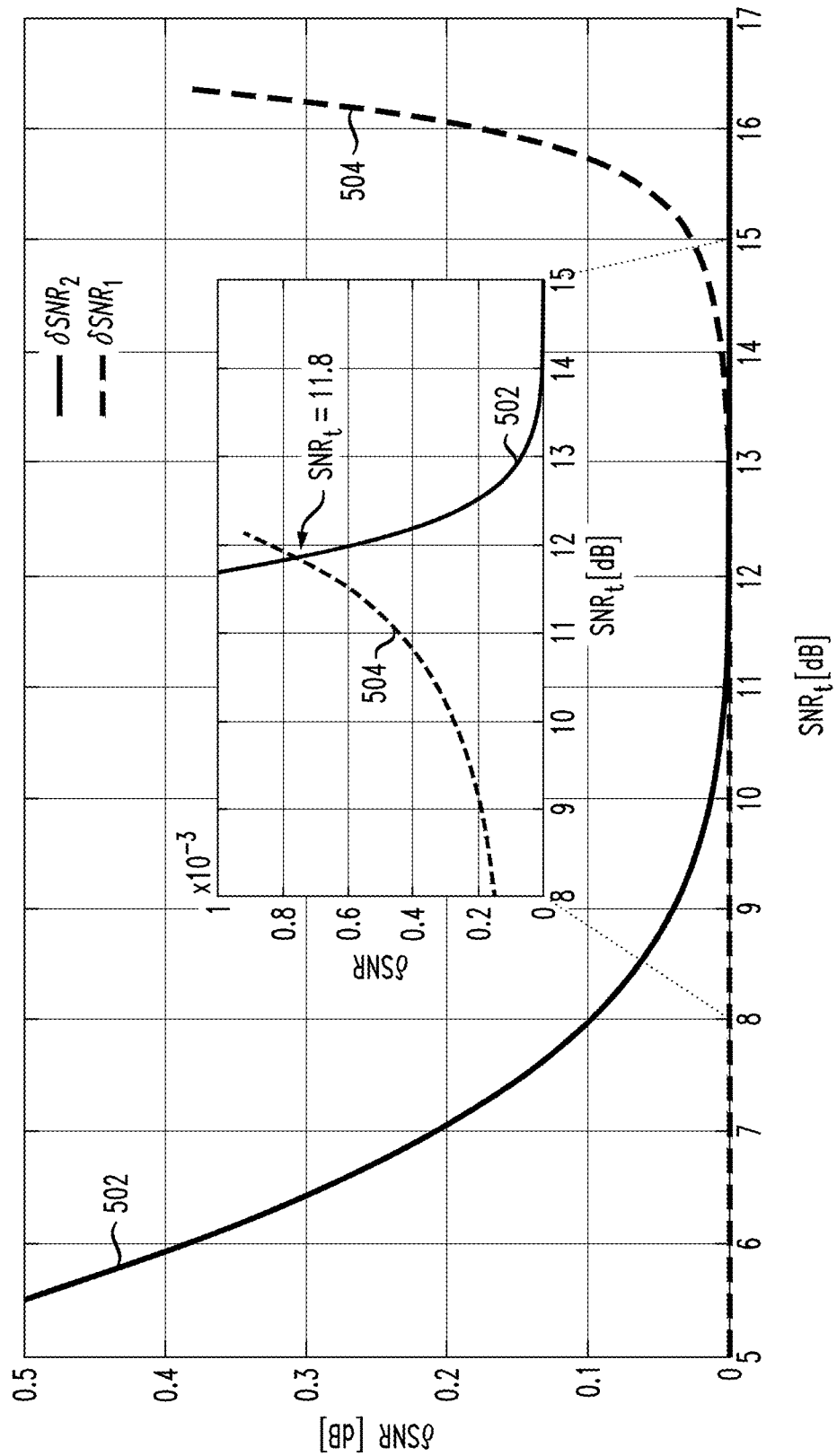
FIG. 5 graphically illustrates some properties of a performance metric that can be measured using the digital signal processor of FIG. 3 according to an embodiment.

FIG. 5 graphically illustrates some properties of the performance metric 372 according to an embodiment. More specifically, FIG. 5 graphically illustrates example contributions to an intrinsic error of $SNR_3$ (denoted as $\delta SNR_3$) as functions of the true effective SNR (denoted as SNR). The results shown in FIG. 5 were obtained using computer simulations, in which $SNR_t$ was a controllable parameter. The simulated system was modeled for 100 Gbps, PDM-QPSK modulation. The acquisition time of error count 362 and of the statistics of signals $342_X$, $342_Y$, $354_X$, and $354_Y$ was set to 1 second.

From Eq. (3), $\delta SNR_3$ can be expressed as follows:

$$\delta SNR_3 = a \cdot \delta SNR_1 + (1-a) \cdot \delta SNR_2 \qquad (6)$$

where $\delta SNR_1$ is an intrinsic error of $SNR_1$; and $\delta SNR_2$ is an intrinsic error of $SNR_2$. Curve 502 shows $\delta SNR_2$ as a function of $SNR_t$. Curve 504 shows $\delta SNR_1$ as a function of $SNR_t$. The inset shows a more-detailed view of curves 502 and 504 in the 8-15 dB interval of $SNR_t$. Therein, curves 502 and 504 intersect at $SNR_t=S_0 \approx 11.8$ dB. In other embodiments, the threshold value $S_0$ may be set to or have a different value, e.g., for a different modulation format.

When $SNR_t<S_0$, $\delta SNR_2$ can be the bigger contributor to $\delta SNR_3$. When $SNR_t>S_0$, $\delta SNR_1$ can be the bigger contributor to $\delta SNR_3$. Based on this observation, signal-quality analyzer 370 can be programmed in several different ways to curtail $\delta SNR_3$ by appropriately selecting the weight a.

For example, in one possible embodiment, the weight a can be selected in accordance with Eq. (7):

$$\begin{cases} a = 1, \text{ if } SNR_t < S_0 \\ a = 0, \text{ if } SNR_t \geq S_0 \end{cases} \qquad (7)$$

where $SNR_t$ is estimated based on signals $342_X$, $342_Y$, $354_X$, $354_Y$, and 362 using Eq. (8):

$$SNR_t \approx \frac{1}{2}(\langle SNR_1 \rangle + \langle SNR_2 \rangle) \qquad (8)$$

where $\langle \cdot \rangle$ denotes a time average. In this particular embodiment, the weight a is changed when the estimated $SNR_t$ crosses the threshold $S_0$.

In another example embodiment, the weight a can be computed in accordance with Eq. (9):

$$a = \frac{\Delta_0 - \langle \delta SNR_2 \rangle}{\langle \delta SNR_1 \rangle - \langle \delta SNR_2 \rangle} \qquad (9)$$

where $\Delta_0$ is a constant; the time-averaged error $\langle \delta SNR \rangle$ is computed based on signal 362 and the corresponding analytical or empirical model of $\delta SNR_1$; and the time-averaged error $\langle SNR_2 \rangle$ is computed based on signals $342_X$, $342_Y$, $354_X$, $354_Y$ and the corresponding analytical or empirical model of $\delta SNR_2$. Curves 502 and 504 shown in FIG. 5 provide examples of such models. In this particular embodiment, the value of $\delta SNR_3$ can be approximately constant (i.e., $\delta SNR_3 \approx \Delta_0$) under different link conditions within the selected range of $SNR_t$, wherein the value of $SNR_t$ is estimated using Eq. (8). For example, the value of $\Delta_0$ can be selected to be $\Delta_0=0.01$ dB.

In yet another example embodiment, a pre-computed look-up table (LUT) can be used instead of Eq. (9). For example, such a LUT can be computed based on an analytical or empirical model of $\delta SNR_3$ and specific performance targets (such as $\Delta_o$) for different operating regimes of system 100 and/or different observed values of $SNR_t$.

FIG. 6 shows a flowchart of a control method 600 that can be used in system 100 according to an embodiment.

At step 602 of method 600, system 100 is transmitting data from optical data transmitter 12 to optical data receiver 62 via a selected lightpath L, delivering a capacity $C_L$ through a selected transponder mode $M_L$. The transponder mode can be defined by several selectable configuration parameters, such as the modulation format, symbol rate, channel spacing, etc.

At step 604, performance monitor 70 operates to collect signals $342_X$, $342_Y$, $354_X$, $354_Y$, and 362 during a measurement period $T_m$. The collected digital samples are then processed, e.g., as indicated above, to compute some or all of the following quantities or of functional equivalents thereof: $SNR_1$, $\delta SNR_1$, $\langle SNR_1 \rangle$, $\langle \delta SNR_1 \rangle$, $SNR_2$, $\delta SNR_2$, $\langle SNR_2 \rangle$, $\langle \delta SNR_2 \rangle$, and $SNR_r$. The computations of step 604 can be performed, e.g., using signal-quality analyzer 370. In some cases, the computation of time-averaged values may also use the results obtained during one or more previous measurement periods $T_m$.

At step 606, performance monitor 70 operates to compute some or all of the following quantities or of functional equivalents thereof: $SNR_3$, $\delta SNR_3$, $\langle SNR_3 \rangle$, $\langle \delta SNR_3 \rangle$, and one or more statistical characteristics thereof. Step 606 also includes a sub-step of determining the weight a as outlined above, e.g., using Eqs. (7), (9) or using a corresponding LUT. The computations of step 606 rely on at least some of the quantities computed at step 604. After completing the computations and based on the results thereof, performance monitor 70 may generate feedback signal 72 for controller 80. In some embodiments, feedback signal 72 may contain some or all of the quantities computed at step 606.

At step 608, controller 80 operates to determine whether or not a change of lightpath L and/or transponder mode $M_L$ is warranted. Although the determination of step 608 typically takes into consideration the feedback signal 72 of step 606, it may also depend on other pertinent information available to controller 80, such as the short-term operator strategy, traffic patterns, additional monitored performance parameters, etc.

In an example embodiment, step 608 may include evaluation of the following inequality:

$$SNR_3 < SNR_{FEC} + M \qquad (10)$$

where $SNR_{FEC}$ is the FEC-code limit; and M is the operator-specified SNR margin. More specifically, $SNR_{FEC}$ is a fixed SNR value below which the FEC-decoding processing performed by FEC decoder 360 typically breaks down due to the number of errors exceeding the error-correction capacity of the employed FEC code. If Inequality (10) is satisfied, then the effective SNR is deemed to be too close to the FEC-code limit, which typically warrants some reconfiguration of system 100.

If controller 80 determines that a configuration change is warranted, then the processing of method 600 is directed to step 610. Otherwise, the processing of method 600 is directed back to step 604.

At step 610, controller 80 operates to change the configuration of system 100. The configuration change may include rerouting the transmitted optical signal through a different selected lightpath L and/or selecting a new transponder mode $M_L$. Example changes may include but are not limited to selecting a different fiber path, a different wavelength channel, a different modulation format, a different symbol rate, and/or a different FEC code. One or more appropriate control signals may be generated by controller 80 to enact the configuration change, including some or all of control signals 82, 84, 86, and 88. Depending on the situation, the new transponder mode $M_L$ may cause the capacity $C_L$ to increase or decrease.

After step 610 is completed, the processing of method 600 is directed back to step 602.

Example advantages and/or benefits of at least some of the above-described embodiments can be illustrated using the following observations. In a regularly performing system 100, the SNR can typically fluctuate by 1-2 dB, e.g., when polarization-dependent loss is present. However, in a malfunctioning system 100, the SNR can fluctuate by more than 5 dB, possibly signifying an imminent outage in the next few hours or even minutes. In the latter scenario, conventional SNR metrics typically provide SNR estimates characterized by relatively large uncertainties (i.e., large measurement error bars) and, as such, may misinform the control entity. In contrast, $\delta SNR_3$ can be relatively small and approximately constant over an even wider SNR range than 5 dB. As a result, $SNR_3$ may be a more suitable indicator for real-time capacity optimization and other corrective actions than some of the conventional SNR metrics. Furthermore, system-alarm triggers and controller decisions may become more reliable, e.g., because abnormal SNR fluctuations are less likely to be buried in (obscured by) the measurement noise of $SNR_3$ than in the measurement noise of conventional SNR metrics. An additional benefit may be derived from the fact that $SNR_3$ tends to necessitate lesser resources than several individual metrics of similar combined utility, e.g., in terms of signaling bandwidth, memory usage, and/or computational power.

The following description provides an example analytical model that can be used, e.g., to program performance monitor 70, controller 80, and/or signal-quality analyzer 370 in some embodiments.

The relative error of the BEP estimated by Monte Carlo error counting is approximately equal to the inverse of the square root of the number $N_e$ of errors counted by FEC decoder 360

$$\frac{\sigma_{BEP}}{\langle BEP \rangle} = \frac{1}{\sqrt{N_e}} \qquad (11)$$

where $\sigma_{BEP}$ is the standard deviation of the BEP; and $\langle BEP \rangle$ is the true average value of the BEP. The $\langle BEP \rangle$ value can be estimated as:

$$\langle BEP \rangle = \frac{1}{N_T} \sum_{k=1}^{N_T} BER_k \qquad (12)$$

where $$BER_k = \frac{N_{e,k}}{N_{b,k}};$$

$N_{e,k}$ is the error count 362 over a block of $N_{b,k}$ bits received in the k-th time period of duration $T_g$; the number $N_T$ is $$N_T = \frac{T_{BEP}}{T_g};$$

and $T_{BEP}$ is the total error-counting time. For a fixed bit rate $R_b$, the number $N_e$ can be estimated as:

$$N_e = \langle BEP \rangle \cdot R_b \cdot T_{BEP} \tag{13}$$

From Eqs. (11) and (13), the uncertainty of BEP (denoted as δBEP can e estimated as:

$$\delta BEP = \sigma_{BEP} = \sqrt{\frac{\langle BEP \rangle}{R_b \cdot T_{BEP}}} \tag{14}$$

For QPSK modulation, Eq. (4) can then be used to rewrite Eq. (14) as follows:

$$\delta SNR_1[dB] \approx \frac{20\sqrt{\pi}}{\ln 10} \cdot \frac{\exp(\text{erfc}^{-1}(2\langle BEP \rangle))^2}{\text{erfc}^{-1}(2\langle BEP \rangle)} \cdot \sqrt{\frac{\langle BEP \rangle}{R_b \cdot T_{BEP}}} \tag{15}$$

where $\langle BEP \rangle$ can be estimated from BER measurements, e.g., using Eq. (12) or another suitable approximation.

When assessing $SNR_2$ from a measured scatter, e.g., similar to the scatter of scatter plot 400 (FIG. 4), a straightforward decision by the quadrant (i.e., A, B, C, D; FIG. 4) results in four sets of complex samples. For each of the sets, one can calculate the expected value and variance and therefore assess the average value of $SNR_2$ over the entire scatter plot. In such cases, it is customary to normalize the total received power (i.e., signal+noise) to 1. After normalization, $SNR_t$ can be estimated as:

$$SNR_t = \frac{1-V}{V} \tag{16}$$

where V is the true complex-sample variance. Based on Eq. (16), $\delta SNR_2$ can be estimated as follows:

$$\delta SNR_2[dB] = \tag{17}$$

$$10\log_{10}\left(\frac{\left[\frac{\exp(SNR_t/2)}{\sqrt{\pi \cdot SNR_t/2}} + \text{erf}(SNR_t/2)\right]^2}{SNR_t + 1 - SNR_t \cdot \left[\frac{\exp(SNR_t/2)}{\sqrt{\pi \cdot SNR_t/2}} + \text{erf}(SNR_t/2)\right]^2}\right)$$

where $SNR_t$ can be linked to $\langle BEP \rangle$ via Eq. (4). It is also known that the variance V estimated from signal samples affected by additive white Gaussian noise (AWGN) has a standard deviation δV expressed as follows:

$$\delta V = V\sqrt{\frac{2}{N_s}} \tag{18}$$

where $N_s$ is the number of signal samples. Using Eq. (16), Eq. (18) can be rewritten as:

$$\delta V[dB] = \frac{10}{\ln 10} \cdot \frac{SNR_t + 1}{SNR_t} \sqrt{\frac{2}{N_s}} \tag{19}$$

A person of ordinary skill in the art will understand that Eq. (19) can be used to obtain another estimate of $\delta SNR_2$. Eq. (19) clearly shows that, for high values of $SNR_t$, $\delta SNR_2$ does not depend on $SNR_t$ and is simply a function of the number $N_s$ of signal samples.

If training symbols are used to calculate the scatter variance (i.e. the transmitted symbols are known to the receiver), then Eq. (19) provides an accurate estimate of the uncertainty. If no training symbols are used and the variance is calculated based on symbol decisions then $\delta SNR_2$ can be estimated as:

$$\delta SNR_2[dB] = \left|\frac{d\overline{SNR_2}[dB]}{dV}\right|\delta V = \left|\frac{d\overline{SNR_2}[dB]}{d\overline{SNR_2}} \cdot \frac{d\overline{SNR_2}}{dSNR_1} \cdot \frac{dSNR_t}{dV}\right|\delta V \tag{20}$$

where the overbar denotes the average over the observation time. For practical purposes, the overall uncertainty can be found as an appropriate function of the uncertainties given by Eqs. (14), (17), (19), and (20), e.g., with the function being constructed to reflect the specific method used for acquiring the SNR estimates and/or statistics.

According to an example embodiment disclosed above, e.g., in the summary section and/or in reference to any one or any combination of some or all of FIGS. 1-6, provided is an apparatus comprising: an optical data receiver (e.g., 62, FIG. 1; 200, FIG. 2) including one or more light detectors (e.g., 161, FIG. 2) connected to convert modulated light into digital samples (e.g., 342, FIG. 3) and further including a symbol decoder (e.g., 350, FIG. 3) and an FEC decoder (e.g., 360, FIG. 3) connected to process the digital samples to recover a data stream (e.g., 102, FIGS. 2, 3) encoded in the modulated light; and a performance monitor (e.g., 70, FIG. 1) to evaluate a performance metric (e.g., 372, FIG. 3) in response to an error count (e.g., 362, FIG. 3) from the FEC decoder and in response to a stream of measured constellation symbols (e.g., 354, FIG. 3) from the symbol decoder, the performance metric being based on a weighted sum of a first signal-quality estimate (e.g., $SNR_1$, Eq. (3)) determined based on the error count and a second signal-quality estimate (e.g., $SNR_2$, Eq. (3)) determined based on deviations of the digital samples from constellation symbols.

In some embodiments of the above apparatus, the performance monitor is configured to select a weight (e.g., a, Eq. (3)) for the weighted sum based on an SNR estimate corresponding to the digital samples.

In some embodiments of any of the above apparatus, the performance monitor is configured to select the weight such that the weight has a first value for one value of the SNR estimate and a different second value for another value of the SNR estimate.

In some embodiments of any of the above apparatus, the performance monitor is configured to select the weight using a look-up table having stored therein different fixed values of the weight for different signal-to-noise ratios.

In some embodiments of any of the above apparatus, the performance monitor is configured to select a first value of the weight if the SNR estimate is smaller than a fixed threshold value (e.g., first line of Eq. (7)); and wherein the performance monitor is configured to select a different second value of the weight if the SNR estimate is larger than the fixed threshold value (e.g., second line of Eq. (7)).

In some embodiments of any of the above apparatus, the performance monitor is configured to compute the SNR estimate based on both the error count and the deviations (e.g., Eq. (8)).

In some embodiments of any of the above apparatus, the performance monitor is configured to select a weight (e.g., a, Eq. (3)) for the weighted sum such that a systematic error of the performance metric does not exceed a fixed limit (e.g., $\Delta_o$, Eq. (9)).

In some embodiments of any of the above apparatus, the performance monitor is configured to select a weight (e.g., a, Eq. (3)) for the weighted sum such that a systematic error of the performance metric is approximately constant (e.g., $\Delta_o$, Eq. (9)) within an SNR range at least 5 dB wide (or at least 10 dB wide).

In some embodiments of any of the above apparatus, the performance metric directly provides an estimate of one of: a quality factor $Q^2$; a Q value expressed in decibel; a bit-error rate; a bit-error probability; and a signal-to-noise ratio.

In some embodiments of any of the above apparatus, the performance monitor comprises a signal-quality analyzer (e.g., 370, FIG. 3) configured to compute the performance metric, the signal-quality analyzer being co-located with the optical data receiver.

In some embodiments of any of the above apparatus, the apparatus further comprises: an optical data transmitter (e.g., 12, FIG. 1) connected to apply the modulated light to the optical data receiver; and an electronic controller (e.g., 80, FIG. 1) configured to cause a change of a transponder mode (e.g., at 610, FIG. 6) for the optical data transmitter in response to the performance metric received from the performance monitor.

In some embodiments of any of the above apparatus, the electronic controller is connected to inform the optical data receiver (e.g., via 86, FIG. 1) about the change.

In some embodiments of any of the above apparatus, the apparatus further comprises an electronic controller (e.g., 80, FIG. 1) configured to cause a change of a lightpath (e.g., at 610, FIG. 6) via which the optical data receiver receives the modulated light, the change being caused in response to the performance metric received from the performance monitor.

In some embodiments of any of the above apparatus, the performance monitor is separated from the optical data receiver by a distance greater than 1 m.

In some embodiments of any of the above apparatus, the optical data receiver comprises a coherent optical receiver (e.g., 200, FIG. 2).

According to another example embodiment disclosed above, e.g., in the summary section and/or in reference to any one or any combination of some or all of FIGS. 1-6, provided is a control method comprising the steps of: (A) generating a first signal-quality estimate (e.g., $SNR_1$, Eq. (3)) based on an error count (e.g., 362, FIG. 3) at an FEC decoder (e.g., 360, FIG. 3) of an optical data receiver; (B) generating a second signal-quality estimate (e.g., $SNR_2$, Eq. (3)) based on deviations of digital samples (e.g., 342, FIG. 3) from constellation symbols (e.g., 354, FIG. 3), the digital samples being generated by the optical data receiver in response to modulated light, the constellation symbols being determined by a symbol decoder of the optical data receiver by constellation-mapping the digital samples; and (C) computing a weighted sum of the first and second signal-quality estimates to generate a performance metric (e.g., 372, FIG. 3; Eq. (3)) for a data link, the modulated light being used in the data link to transmit a data stream (e.g., 102, FIGS. 2, 3) to the optical data receiver.

In some embodiments of the above control method, the control method further comprises the step of changing (e.g., at 610, FIG. 6), based on the performance metric, at least one of a lightpath in the data link and a transponder mode used for generating the modulated light.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising:
   an optical data receiver including one or more light detectors connected to convert modulated light into digital samples and further including a symbol decoder and an FEC decoder connected to process the digital samples to recover a data stream encoded in the modulated light; and
   a performance monitor to evaluate a performance metric in response to an error count from the FEC decoder and in response to a stream of measured constellation symbols from the symbol decoder, the performance metric being based on a weighted sum of a first signal-quality estimate determined based on the error count and a second signal-quality estimate determined based on deviations of the digital samples from constellation symbols.

2. The apparatus of claim 1, wherein the performance monitor is configured to select a weight for the weighted sum based on an SNR estimate corresponding to the digital samples.

3. The apparatus of claim 2, wherein the performance monitor is configured to select the weight such that the weight has a first value for one value of the SNR estimate and a different second value for another value of the SNR estimate.

4. The apparatus of claim 2, wherein the performance monitor is configured to select the weight using a look-up table having stored therein different fixed values of the weight for different signal-to-noise ratios.

5. The apparatus of claim 2,
wherein the performance monitor is configured to select a first value of the weight if the SNR estimate is smaller than a threshold value; and
wherein the performance monitor is configured to select a different second value of the weight if the SNR estimate is larger than the threshold value.

6. The apparatus of claim 2, wherein the performance monitor is configured to compute the SNR estimate based on both the error count and the deviations.

7. The apparatus of claim 1, wherein the performance monitor is configured to select a weight for the weighted sum such that a systematic error of the performance metric does not exceed a fixed limit.

8. The apparatus of claim 1, wherein the performance monitor is configured to select a weight for the weighted sum such that a systematic error of the performance metric is approximately constant within an SNR range at least 5 dB wide.

9. The apparatus of claim 1, wherein the performance metric directly provides an estimate of one of:
a quality factor $Q^2$;
a Q value expressed in decibel;
a bit-error rate;
a bit-error probability; and
a signal-to-noise ratio.

10. The apparatus of claim 1, further comprising:
an optical data transmitter connected to apply the modulated light to the optical data receiver; and
an electronic controller configured to cause a change of a transponder mode for the optical data transmitter in response to the performance metric received from the performance monitor.

11. The apparatus of claim 10, wherein the electronic controller is connected to inform the optical data receiver about the change.

12. The apparatus of claim 1, further comprising an electronic controller configured to cause a change of a lightpath via which the optical data receiver receives the modulated light, the change being caused in response to the performance metric received from the performance monitor.

13. The apparatus of claim 1, wherein the optical data receiver comprises a coherent optical receiver.

14. A control method, comprising:
generating a first signal-quality estimate based on an error count at an FEC decoder of an optical data receiver;
generating a second signal-quality estimate based on deviations of digital samples from constellation symbols, the digital samples being generated by the optical data receiver in response to modulated light, the constellation symbols being determined by a symbol decoder of the optical data receiver by constellation-mapping the digital samples; and
computing a weighted sum of the first and second signal-quality estimates to generate a performance metric for a data link, the modulated light being used in the data link to transmit a data stream to the optical data receiver.

15. The control method of claim 14, further comprising changing, based on the performance metric, at least one of a lightpath in the data link and a transponder mode used for generating the modulated light.

* * * * *